Aug. 30, 1949.                    C. A. HELBER                        2,480,576
                                  PHASE ADAPTER
                              Filed Dec. 30, 1947
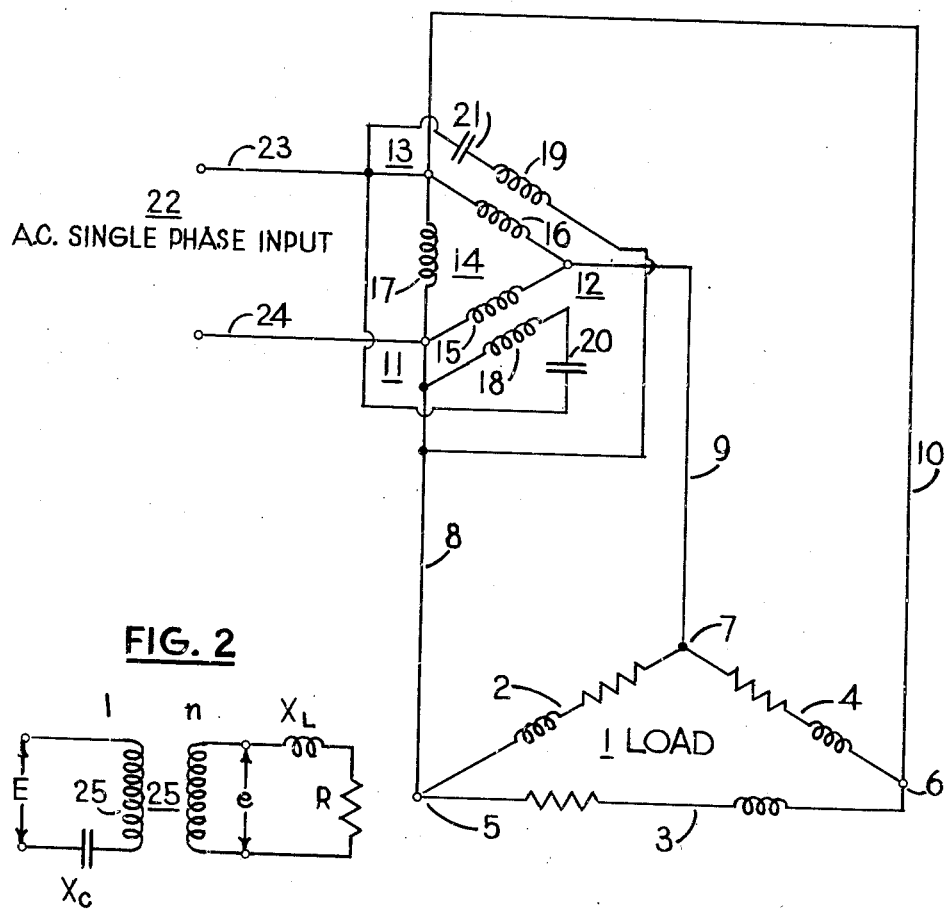
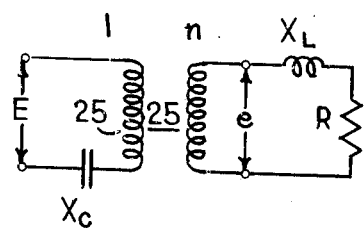
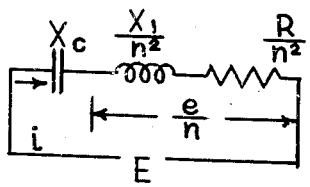
*INVENTOR.*
*CARL A. HELBER*
BY
*Frank H. Harmon*
*attorney*

Patented Aug. 30, 1949

2,480,576

UNITED STATES PATENT OFFICE 2,480,576

PHASE ADAPTER

Carl A. Helber, Maple Heights, Ohio, assignor to Jack & Heintz Precision Industries, Inc., Cleveland, Ohio, a corporation of Delaware Application December 30, 1947, Serial No. 794,767

2 Claims. (Cl. 172—238)

This invention relates to phase adapters and has for a primary object to provide a system whereby three phase alternating current loads may use a single phase alternating current source of supply.

Another object is to provide a phase adapter that will permit connection of a particular three phase load to a particular single phase source of supply of alternating current.

A further object is to provide a static transformer phase adapter that will permit connection of a particular three phase load to a single phase source of alternating current.

A more particular object is to provide a phase adapter which may be readily modified in design to permit connection of different three phase A. C. loads to a given single phase source of supply.

With the foregoing and other objects in view, the invention resides in the combination of parts and in the details of construction hereinafter set forth in the following specification and appended claims, certain embodiments thereof being shown in the accompanying drawings, in which:

Figure 1 is a wiring diagram of the phase adapter;

Figure 2 is a schematic wiring diagram illustrating one step of phase adapter analysis; and Figure 3 is a schematic wiring diagram illustrating one step of phase adapter analysis.

By use of this phase adapter the need for two transformers as in the "Scott Connection" adapters is eliminated. Also the efficiency of this adapter is considerably higher than that of the "Scott Connection" or other types of phase adapters because no resistances are employed in the adapter other than the resistances of the transformer windings themselves.

Referring to Figure 1, a three phase load designated generally as 1 is shown having impedances 2, 3 and 4 and load terminals 5, 6 and 7. The load 1 is connected by lines 8, 9 and 10 to terminals 11, 12 and 13 of a closed delta connected transformer designated generally as 14. Transformer 14 has primary windings 15, 16 and 17 and secondary windings 18 and 19. The secondary winding 18 has a condenser 20 in series with it and is connected between terminals 11 and 13 of the transformer. The secondary winding 19 has a condenser 21 in series with it and is also connected across terminals 11 and 13 of the transformer. A single phase source of alternating current supply 22 is connected by lines 23 and 24 to terminals 12 and 11 respectively of transformer 14.

Assume for purposes of explanation of the operation of the phase adapter that it is desired to provide two voltages of equal magnitude, each being equal to the input voltage and one being 120° out of phase with the input voltage. The circuit theory has been worked out which determines the transformer winding ratios and condenser reactances to provide output voltages with the necessary phase shift and correct amplitude for a given load.

In Figures 2 and 3, $n$ is the turn ratio of one phase, $X_1$ is the load reactance of that phase, and $R$ is the resistance of that phase. $E$ is the input voltage, $e$ is the phase voltage, $i$ is the current flowing in the direction of the arrow and $X_c$ is the capacitive resistance for that phase. The ratio of winding 25 to 26 is as $n$ is to 1.

Analyzing a particular phase for its required constants for a given load is accomplished as follows:

In Figure 2

$$1e1 = 1E1$$

$$\frac{e}{E} = e^{i\phi} \ ; \ \phi = \pm \frac{2\pi}{3}$$

In Figure 3

$$i = \frac{E}{\frac{e}{n}2 + j\left(\frac{X_1}{n^2} - X_c\right)}$$

therefore by substitution $$\frac{e}{n} = \frac{E\left(\frac{R_2}{n} + j\frac{X_1}{n^2}\right)}{\frac{R_2}{n} + j\left(\frac{X_1}{n^2} - X_c\right)}$$

By transposing $$\frac{e}{E} = \frac{\frac{1}{n}(R + jX_1)}{\frac{1}{n^2}(R + jX_1 - n^2 X_c)} = \frac{n(R + jX_1)}{R + j(X_1 - n^2 X_c)}$$

and $$\frac{e}{E} = \frac{n(R + jX_1)(R - jX_1 - n^2 X_c)}{R^2 = (X_1 - n^2 X_c)^2}$$

$$\frac{e}{E} = \frac{n}{R^2 + (X_1 - n^2 X_c)^2}(R^2 + X_1(X_1 - n^2 X_c) +$$

$$j(RX_1 - R(X_c - n^2 X_c))$$

$$\frac{e}{E} = \frac{n}{R^2 + (X_1 - n^2 X_c)^2} 2((R^2 + X_1^2 - n^2 X_1 X_c)^2 +$$

$$(n^2 R X_c)^2)^{\frac{1}{2}} = 1$$

Therefore since $$\frac{e}{E} = 1 \text{ tangent } \phi = \pm\sqrt{3} \text{ and } \cos \phi = -\frac{1}{2}$$

Now
$$n^2 X_c = \frac{(R^2+X1^2)\tan\phi}{(R+X1)\tan\phi}$$

therefore $$n^2 = \left(\frac{(R^2+X1^2)\tan\phi}{R+X1\tan\phi}\right)\left(\frac{R^2\sec^2\phi}{(R^2+X1^2\tan\phi)(R+X1\tan\phi)}\right)$$

Reducing $$n = \pm\frac{R\sec\phi}{R+X1\tan\phi}$$

By substitution $$X_c = \frac{((R^2+X1^2)\tan\phi)(R+X1\tan\phi)}{R^2\sec^2\phi}$$

Knowing the value of $X_c$, $c$ may be found by the formula:

$$c = \frac{1}{2\pi f X_c}$$

The number of turns on each primary winding is then divided by its respective secondary winding ratio $n$ as above determined to arrive at the number of turns required on that secondary. The required capacitance of the condenser in each phase is found by substituting values in the above formula to determine $X_c$ for each phase. Only impedances 2 and 4 are important because impedance 3 is connected across the supply voltage and hence cannot affect the operation of the phase shifting network.

The condenser 21 is used to shift the phase angle of the load impedance 4 a total of —120° from its original value. The transformer then corrects the voltage to the proper amplitude. The condenser 20 shifts the phase angle of the load impedance 2 by a total of —60° and the transformer is connected in such a way as to shift the phase angle by a further 180° while also making the proper voltage amplitude correction. The three phase voltages are then all equal and spaced 120° apart.

Thus it is seen that any given three phase load, the impedances of each phase being known, may be connected to a given single phase source of supply through this phase adapter; it being merely necessary to determine the correct circuit constants for the adapter for that particular load.

I claim:
1. A phase adapter for connection between a three phase A. C. load and a single phase A. C. source of supply comprising a three phase closed delta transformer having three primary windings and two secondary windings, a pair of single phase voltage input terminals, means to connect one of the primary windings of the transformer across said voltage input terminals and across one phase of the three phase load, means to connect each of the other primary windings of the transformer across one of the remaining phases of the load and a condenser in series with each of the secondary windings of the transformer, the secondary windings being associated with the primary windings other than the one which is connected across the voltage input terminals.

2. A phase adapter for connection between a given three phase A. C. load and a single phase A. C. source of supply comprising a three phase closed delta transformer having three primary windings, a pair of single phase voltage input terminals, means to connect one of the primary windings of the transformer across said voltage input terminals and across one phase of the three phase load a secondary winding associated with each of the primary windings of the transformer other than the primary winding connected across the voltage input terminals, the turn ratio between said secondary and primary windings being predetermined by the given load to give a transformed voltage of a particular amplitude, and a condenser in series with each of the secondary windings to shift the phase of each of the transformed voltages, the capacitance of each condenser being predetermined in accordance with the desired phase shift for each phase of the given three phase load.

CARL A. HELBER.

REFERENCES CITED

The following references are of record in the file of this patent:

UNITED STATES PATENTS

| Number | Name | Date |
|---|---|---|
| 1,811,861 | Nyman et al. | June 30, 1931 |
| 1,867,503 | Fitz et al. | July 12, 1932 |
| 2,428,586 | Rose | Oct. 7, 1947 |